United States Patent
Yeh et al.

(10) Patent No.: US 7,310,562 B2
(45) Date of Patent: Dec. 18, 2007

(54) SYSTEM AND METHOD FOR SCHEDULING MOLD MANUFACTURING

(75) Inventors: Pu-Yang Yeh, Tu-Cheng (TW); Xu-Liang Guo, Shenzhen (CN); Zhun Xiao, Shenzhen (CN); Qiang Zhong, Shenzhen (CN); Guo-Guang Liu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 210 days.

(21) Appl. No.: 11/148,658

(22) Filed: Jun. 9, 2005

(65) Prior Publication Data

US 2006/0058902 A1    Mar. 16, 2006

(30) Foreign Application Priority Data

Sep. 10, 2004    (TW) .............................. 93127567 A (51) Int. Cl.
*G06F 19/00* (2006.01)

(52) U.S. Cl. ........................ 700/100; 700/69; 700/197; 700/204; 705/9

(58) Field of Classification Search ................ 700/100, 700/108, 197, 204; 705/9; 707/1–10, 100–104.1, 707/200–206

See application file for complete search history.

(56) References Cited

U.S. PATENT DOCUMENTS

| | | | |
|---|---|---|---|
| 5,231,567 A * | 7/1993 | Matoba et al. .............. 700/100 |
| 5,237,508 A * | 8/1993 | Furukawa et al. ........... 700/100 |
| 5,586,021 A * | 12/1996 | Fargher et al. .............. 700/100 |
| 5,761,063 A | 6/1998 | Jannette et al. |
| 5,826,236 A * | 10/1998 | Narimatsu et al. .............. 705/8 |
| 6,226,561 B1 * | 5/2001 | Tamaki et al. .............. 700/100 |
| 6,519,498 B1 * | 2/2003 | Jevtic et al. ................. 700/101 |
| 2002/0065704 A1 * | 5/2002 | Wada et al. .................... 705/9 |
| 2004/0093351 A1 * | 5/2004 | Lee et al. ................. 707/104.1 |
| 2005/0228521 A1 * | 10/2005 | Nomoto et al. ............... 700/97 |

* cited by examiner

*Primary Examiner*—Leo Picard
*Assistant Examiner*—Sheela Rao
(74) *Attorney, Agent, or Firm*—Morris Manning Martin LLP; Tim Tingkang Xia, Esq.

(57) ABSTRACT

A system for scheduling mold manufacturing includes a number of user computers (1) connected with a server (3) by a network (2), a standard parameter database (5), and a task scheduling database (6). Each user computer includes a standard parameter setting module for setting standard parameters; a task scheduling module for analyzing and calculating a workload of each manufacturing unit and machine, generating a workload list, scheduling working procedures of mold manufacturing, simulating scheduling results, generating a schedule, and transmitting the schedule; a task tracking and feedback module for tracking and sending out feedback of current process and workloads of manufacturing units and machines, generating a work process list, and dynamically updating the workload list. A related method is also disclosed.

12 Claims, 7 Drawing Sheets

SYSTEM AND METHOD FOR SCHEDULING MOLD MANUFACTURING

BACKGROUND OF THE INVENTION

1. Field of the Invention

The present invention relates to a computerized system and method for scheduling mass production manufacturing, and more particularly to a system and method for scheduling mold manufacturing.

2. General Background

Nowadays, competition between manufacturing enterprises is often fierce. Many mass production facilities are upgrading their equipment and systems even faster than before. How to improve manufacturing efficiency and effectively take part in global market competition is becoming a focus of more and more companies. Project Management Systems (PMS) is an approach applied broadly in manufacturing, construction, and engineering. PMS is used to make manufacturing cycle times shorter, improve efficiency, save labor and decrease costs with the development of computer science and technology. Microsoft Project 98, Project 2000 and Project XP are items of PMS software broadly applied in manufacturing, government, and the business world. Taking Project 2000 as an example, when a user proposes to manage a project, he must divide the project into a plurality of tasks manually, and manage each task in four phases. The phases are an original plan, a current plan, a practice plan and an unfinished plan, and the user can check every phase in the database. The advantage of Project 2000 is that it can schedule the project automatically after the user inputs all the needed information.

U.S. Pat. No. 5,761,063, entitled Design and Engineering Project Management System and issued on Jun. 2, 1998, discloses a design and engineering project management system including a computer. The system also preferably includes logic for identifying one or more strategies for achieving group objectives and presenting the strategies in a graphic form which allows for quick comparison of competing strategies. The system further preferably includes logic for quantitatively measuring progress toward each group's stated objectives, and for providing a plurality of graphic displays indicating each group's, and the entire project's, progress toward the respective objectives.

The system described above is structured for flexibility and universality of application in various different areas of endeavor such as education and construction. However, users must set limited resource parameters and manually divide the projects into tasks using other known techniques. This decreases the efficiency of project management. In addition, the system focuses on the projects itself, rather than on constituent units that contribute to executing the projects such as a manufacturing plant and a servicing department. Modern manufacturing enterprises need an effective project management system and method which focus on supporting departments, in order to effectively manage a plurality of projects at the same time.

In a particular example, what is needed is a system for scheduling mold manufacturing which can focus on manufacturing units as objects, schedule mold manufacturing and working procedures, and output a schedule, a work process list and a workload list.

Similarly, what is also needed is a method for scheduling mold manufacturing which can focus on manufacturing units as objects, schedule mold manufacturing and working procedures, and output a schedule, a work process list and a workload list.

SUMMARY

One embodiment provides a system for scheduling mold manufacturing, the system comprising: a standard parameter database for storing system standard parameter; a task scheduling database for storing scheduling data; a server including a data accessing module for accessing data from the standard parameter database and the task scheduling database; and a plurality of user computers connecting with the standard parameter database and the task scheduling database. Each user computer comprises: a parameter setting module for setting standard parameters; a task scheduling module for analyzing and calculating workload of each manufacturing unit and machine, generating a workload list, scheduling working procedure of mold manufacturing, simulating scheduling results, generating a schedule and saving the schedule in the task scheduling database, transmitting the schedule to manufacturing units; and a task tracking and feedback module for tracking and sending out feedback of the current process and workloads of the manufacturing units and machines, generating a work process list, dynamically updating the workload list stored in the task scheduling database, and determining whether to adjust the schedule.

Another embodiment provides a method for scheduling mold manufacturing, comprising the steps of: setting parameters; obtaining a mold component list; calculating a completion time of a mold manufacturing process; allocating manufacturing units and machines for the mold components; calculating workload of each manufacturing unit and machine; determining key mold components and key working procedures; scheduling mold manufacturing working procedures, simulating scheduling results; generating a schedule and a workload list, transmitting the schedule to the manufacturing units; tracking and sending out feedback of workload of the manufacturing units and machines, dynamic updating the workload list stored in the task scheduling database; and determining whether mold manufacturing process can be completed in the completion time, if the mold manufacturing process cannot be completed in the completion time, adjusting the schedule.

Other objects, advantages and novel features of the embodiments will be drawn from the following detailed description together with the attached drawings, in which:

DETAILED DESCRIPTION OF THE EMBODIMENTS

Figure 1:
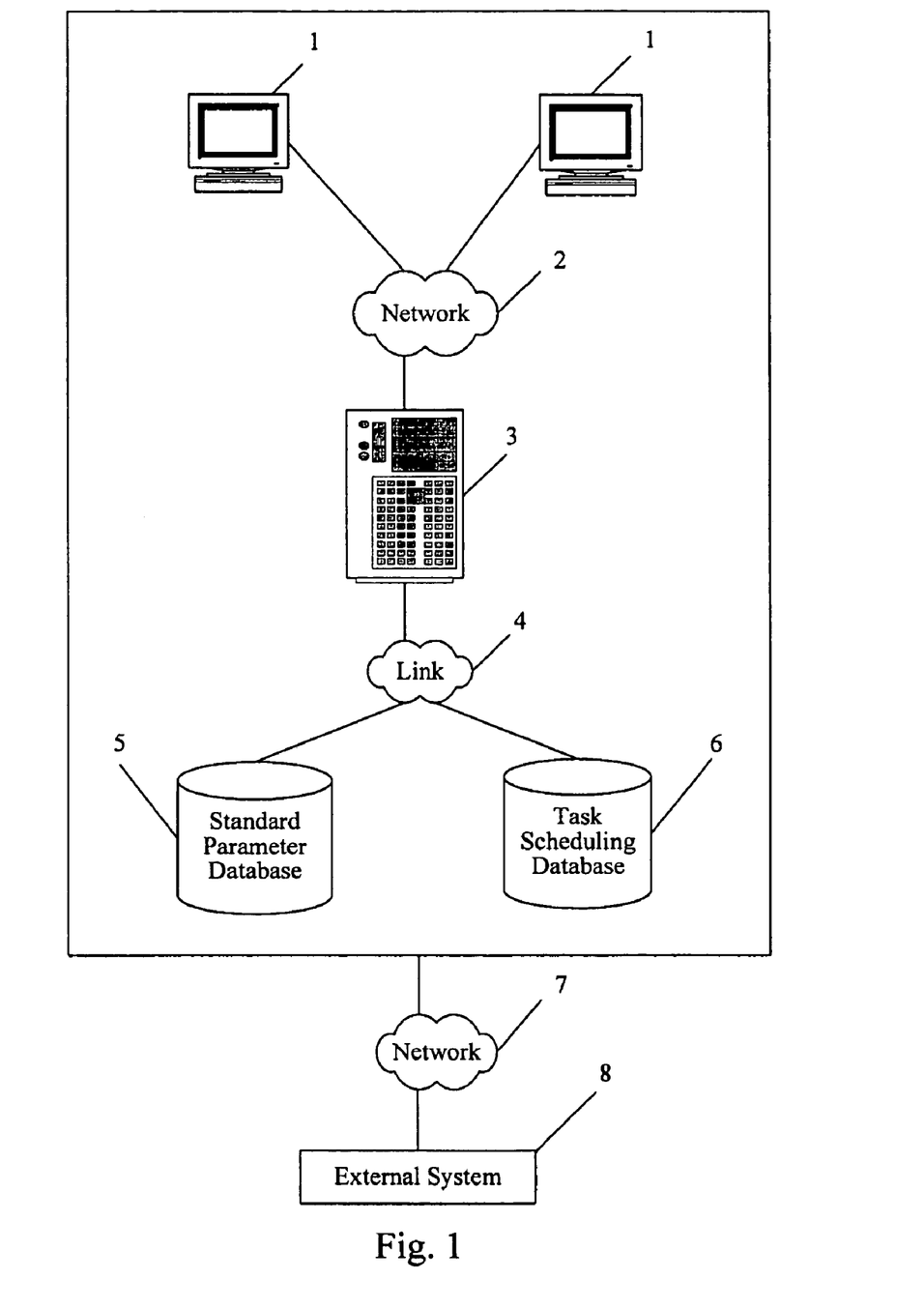
FIG. 1 is a block diagram of hardware configuration and an application environment of a system for scheduling mold manufacturing in accordance with a preferred embodiment of the present invention.

FIG. 1 is a block diagram of hardware configuration and an application environment of a system for scheduling manufacturing of a workpiece like a mold (hereinafter, "the system") in accordance with a preferred embodiment of the present invention. The system comprises a plurality of user computers 1 (only two shown) for setting standard parameters, analyzing and calculating a workload of each of manufacturing units and machines, generating a workload list, scheduling working procedures of mold manufacturing, simulating scheduling results, generating a schedule and saving the schedule, transmitting the schedule to relevant manufacturing units, and tracking and sending out feedback of workloads of the manufacturing units and machines. The user computers 1 can be desktop computers, laptop computers, or server computers. The user computers 1 are connected with a server 3 via a network 2. The network 2 can be an intranet, the Internet, or any other suitable type of communication network. The server 3 is typically a server computer, for accessing data from a standard parameter database 5 and a task scheduling database 6 through a link 4. The link 4 may be an SQL database connectivity (SDBC), an open database connectivity (ODBC), or a Java database connectivity (JDBC).

The standard parameter database 5 may be an SQL server 2000 database or any other database suitable for storing standard parameters. The standard parameters include user authority data, working procedure parameters of mold manufacturing, and manufacturing capability parameters. The user authority data include users' names, respective passwords and authority ranks. The working procedure parameters can be divided into parameters of mold manufacturing such as electrical machining, line cutting, and computer numerical control (CNC) machining. The working procedure parameters typically include numbers of manufacturing units and machines, default sequences of the working procedures, etc. The manufacturing capability parameters include maximal manufacturing capability parameters and standard manufacturing capability parameters of various manufacturing units and machines. The standard manufacturing capability parameters are preset to values of the manufacturing capabilities of the manufacturing units and machines when operating in a normal mode. For example, if a manufacturing capability of a machine running for one hour is 1 unit, and the machine runs for 8 hours every day in the normal mode, then the standard manufacturing capability of the machine in one day is 8 units, and in one week is 40 units. The maximal manufacturing capability parameters are preset to values of the manufacturing capabilities of the manufacturing units and machines when operating in an overtime mode. For example, if the above-described machine runs for an additional 12 hours a day, the maximal manufacturing capability of the machine is 20 units a day in the overtime mode. Work time is one kind of variable parameter used to value the manufacturing capabilities. Other variable parameters, such as numbers of working procedures, can also be used to calculate values of the manufacturing capabilities.

The task scheduling database 6 is an SQL server 2000 database or any other database suitable for storing data. The data includes mold component lists, schedules, work process lists, and workload lists. The mold component lists are mold component manufacturing data lists in preset format based on customers orders, and include the names and numbers of the mold components, names of the working procedures, required completion times of the mold component manufacturing, workloads of the mold manufacturing, the customer's name, a priority parameter of the mold manufacturing, herein the priority parameter defines the existence and rank of a priority of the mold manufacturing, etc. Schedules are manufacturing plans that record manufacturing tasks of the manufacturing units and machines for every day, every week and every month. Work process lists record the current process of manufacturing work of manufacturing units and machines, including information about the start time and conditions of the process. The work process lists can be listed by names of the mold components, customers, manufacturing units, and machines. The workload lists record the proportions between the current workloads and the manufacturing capabilities of the manufacturing units and machines.

The system is connected with one or more external systems 8 (only one shown) by a network 7. The external systems 8 are information management computer systems or any other computer systems relevant to the system. The network 7 is an electronic communications network that supports Transmission Control Protocol and Internet Protocol (TCP/IP). The network 7 can be an intranet, the Internet, or any other suitable type of communications network.

Figure 2:
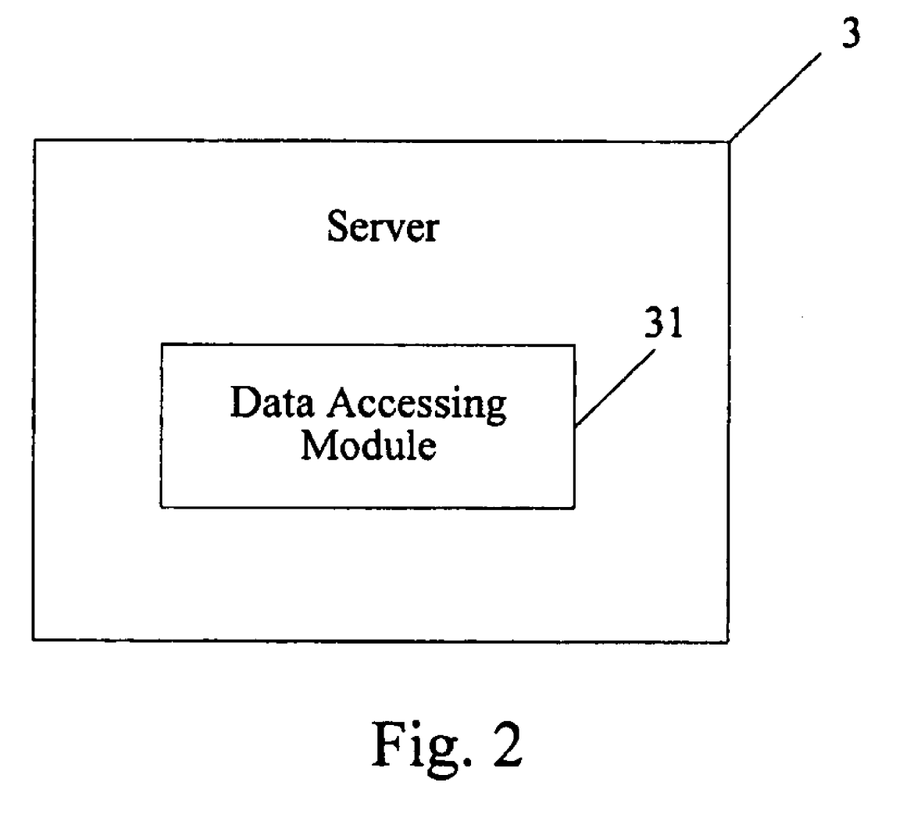
FIG. 2 is a schematic diagram of infrastructure of a server of the system of FIG. 1.

FIG. 2 is a schematic diagram of infrastructure of the server 3. The server 3 includes a data accessing module 31 for accessing data from the standard parameter database 5 and the task scheduling database 6.

Figure 3:
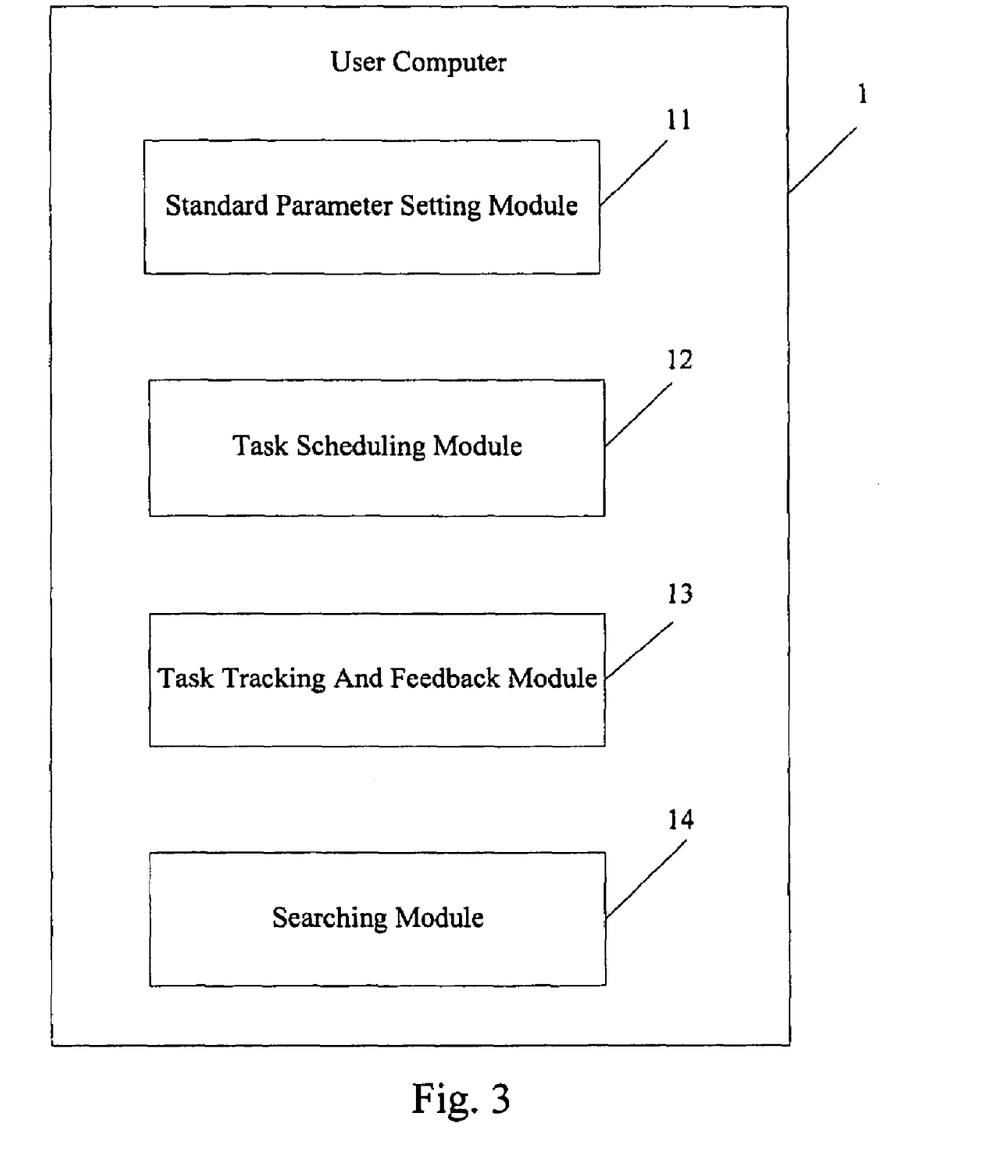
FIG. 3 is a schematic diagram of main function modules of any one user computer of the system of FIG. 1.

FIG. 3 is a schematic diagram of main function modules of any one user computer 1. A standard parameter setting module 11 sets standard parameters including user authority data, working procedure parameters, and manufacturing capabilities. A task scheduling module 12 analyzes and calculates a workload of each manufacturing unit and machine, generates a workload list, schedules working procedures of mold manufacturing, simulates scheduling results, generates a schedule to be stored in the task scheduling database 6, and transmits the schedule to relevant manufacturing units. A work tracking and feedback module 13 tracks and sends out feedback of current process and workloads of the manufacturing units and machines, generates a work process list and dynamically updates the workload list stored in the task scheduling database 6, and determines whether to adjust the schedule. A searching module 14 searches for the schedules, the work process list and the workload list according to search requests.

Figure 4:
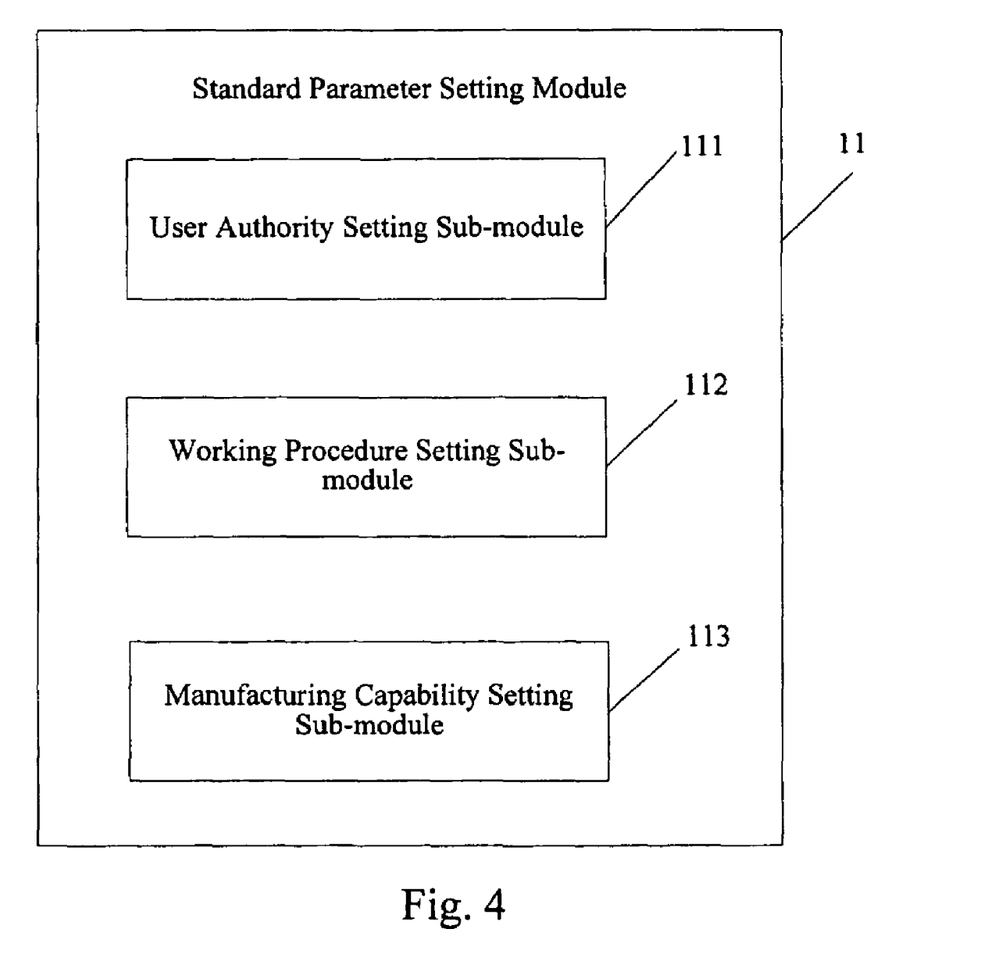
FIG. 4 is a schematic diagram of main function sub-modules of a standard parameter setting module of the user computer of FIG. 3.

FIG. 4 is a schematic diagram of main function sub-modules of the standard parameter setting module 11. A user authority setting sub-module 111 sets users' names, respective passwords and authority ranks, to allow different users to enter the system to configure parameters and obtain pertinent information from the system. A working procedure setting sub-module 112 sets the working procedure parameters of mold manufacturing. A manufacturing capability setting sub-module 113 sets the maximal manufacturing capability parameters and standard manufacturing capability parameters of manufacturing units and machines. A system administrator sets the user authority data when the system is operated for the first time, through the user authority setting sub-module 111. Then, relevant manufacturing units set the working procedure parameters of mold manufacturing and manufacturing capability parameters through the working procedure setting sub-module 112 and the manufacturing capability setting sub-module 113. All the parameters can be updated if and as necessary.

Figure 5:
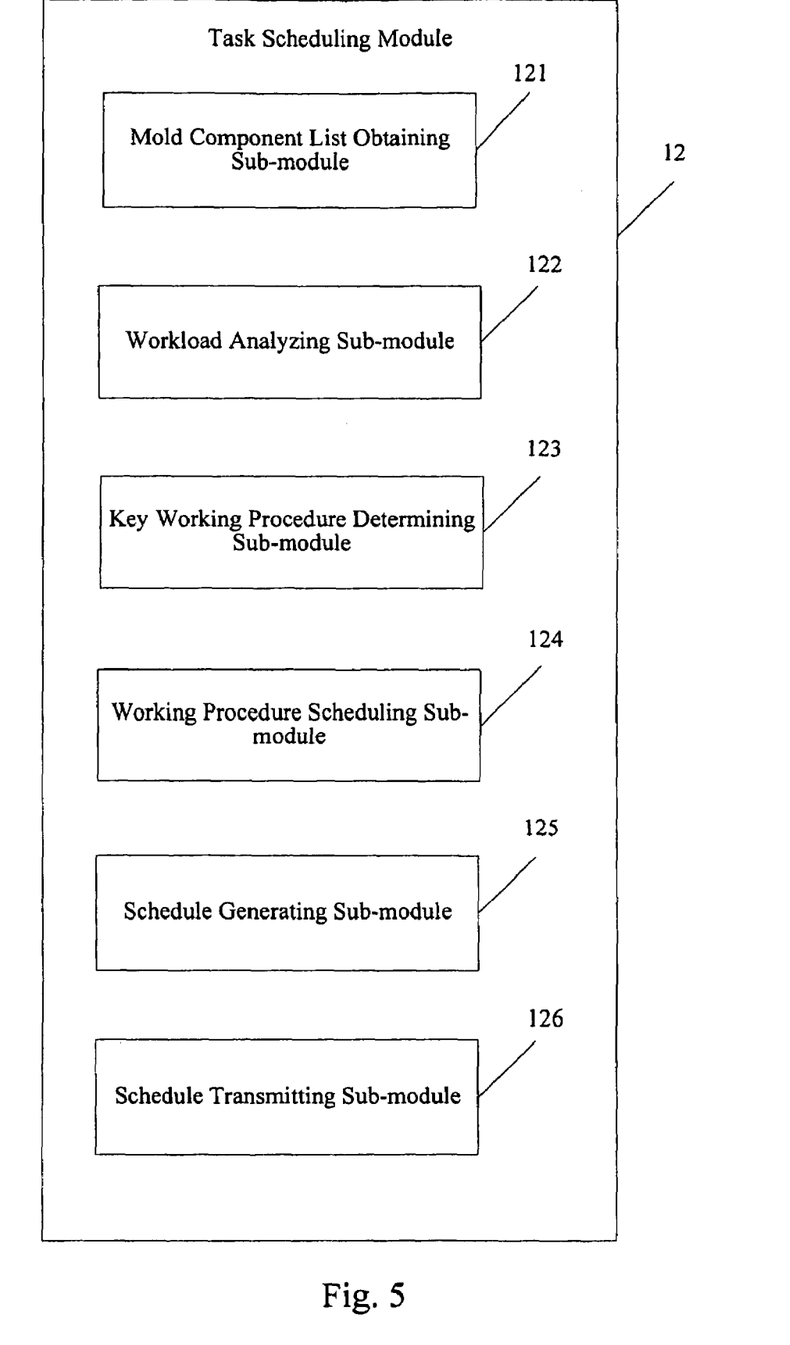
FIG. 5 is a schematic diagram of main function sub-modules of a task scheduling module of the user computer of FIG. 3.

FIG. 5 is a schematic diagram of main function sub-modules of the task scheduling module 12. A mold component list obtaining sub-module 121 reads and analyzes data of the mold component list, calculates a completion time of the mold manufacturing according to required completion times of all relevant mold component, and allocates corresponding manufacturing units according to names of the working procedures.

A workload analyzing sub-module 122 loads the manufacturing capabilities of relevant manufacturing units and machines stored in the standard parameter database 5, calculates the workloads of manufacturing units and machines as regards pre-scheduling tasks and scheduled tasks, and calculates the workloads of the manufacturing units and machines.

A key working procedure determining sub-module 123 determines key mold components and key working procedures. If the value of the workload rate of a machine is more than 95% (the determining standard of the workload rate can be freely set between 80% and 100%), then the machine is defined as a key machine, the component manufactured by the machine is defined as a key component, and the working procedure involving the key machine is defined as a key working procedure. The key working procedure determining sub-module 123 selects the key working procedure with a latest completion time from all of key working procedures, and determines the start time of the selected key working procedure.

A working procedure scheduling sub-module 124 schedules the mold manufacturing working procedures based on the key working procedure with the latest completion time of manufacturing, loads the manufacturing capability parameters and the workload rates of the key machine, and schedules the mold manufacturing working procedures in order of the completion times. For example, if a limited capability principle is adopted, the working procedure scheduling sub-module 124 schedules the working procedures from the last to the first of the default sequences of the working procedures recorded in the standard parameter database 5, generates primary scheduling results accordingly, and determines the schedules of the key working procedures. In the limited capability principle, firstly, if there are more than two working procedures for one mold component, the schedules of working procedures must follow the order of the working procedure parameters stored in the standard parameter database 5. Secondly, if there are more than two working procedures with a same completion time, then in order to decrease the total amount of production activity in manufacturing at any given time, the working procedure with a shorter manufacturing period is scheduled to be manufactured before the working procedure with a longer manufacturing period. Thirdly, the schedule must follow the priority parameters of the mold manufacturing recorded in the mold component list stored in the task scheduling database 6, to ensure that the working procedure with a priority is manufactured first. The limited capability principle is just one principle of various scheduling principles and methods that can be applied in the system. Other principles include an earliest time principle to schedule the working procedures from the earliest possible time, a push plan principle, and a pull plan principle.

The working procedure scheduling sub-module 124 simulates scheduling results, and determines whether the mold manufacturing process can be completed within the completion time. If the manufacturing process cannot be completed within the completion time under a normal mode, then the working procedure scheduling sub-module 124 starts an overtime mode, loads the maximal manufacturing capability parameters stored in the standard parameter database 5, schedules the working procedures under the overtime mode, generates scheduling results accordingly, simulates the scheduling results under the overtime mode, and determines whether the manufacturing process can be completed within the completion time. If the manufacturing process cannot be completed within the completion time, the working procedure scheduling sub-module 124 transmits one or more alarms to recommend that relevant manufacturing units amend the mold component list.

A schedule generating sub-module 125 generates a schedule. A schedule transmitting sub-module 126 transmits the schedule to the manufacturing units.

Figure 6:
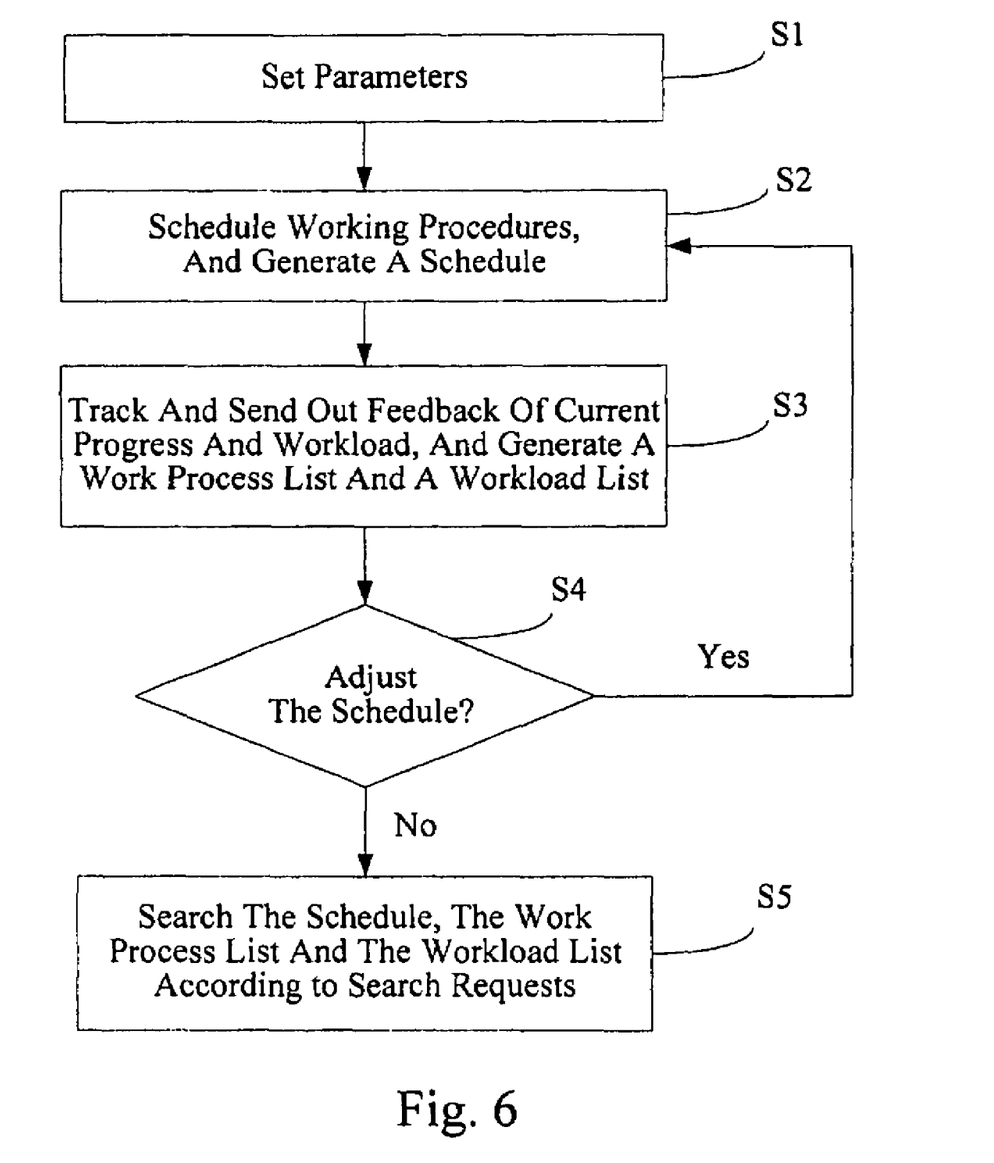
FIG. 6 is a flow chart of a preferred method for scheduling mold manufacturing by utilizing the system of FIG. 1.

FIG. 6 is a flow chart of a preferred method for scheduling mold manufacturing by utilizing the system of FIG. 1. In step S1, a system administrator sets user authorities when the system is used for the first time through the user authority setting sub-module 111. Then, relevant manufacturing units set respective working procedure parameters of the mold manufacturing as well as maximal manufacturing capability parameters and standard manufacturing capability parameters through the working procedure setting sub-module 112 and the manufacturing capability setting sub-module 113. In step S2, the task scheduling module 12 schedules mold manufacturing working procedures, simulates scheduling results, generates a schedule, and transmits the schedule to the manufacturing units (this step is described in detail below in relation to FIG. 7). In step S3, the work tracking and feedback module 13 tracks and sends out feedback of current process and workloads of the manufacturing units and machines, generates a work process list and a workload list, and stores the work process list and workload list in the task scheduling database 6. During the process of mold manufacturing, working conditions of the manufacturing units and machines change accordingly. The work tracking and feedback module 13 sends out feedback, and updates the manufacturing capability parameters of the manufacturing units and machines stored in the standard parameter database 5 and the workload list stored in the task scheduling database 6. In step S4, the work tracking and feedback module 13 determines whether it is necessary to adjust the schedule by determining whether the manufacturing process can be completed within the completion time. If it is necessary to adjust the schedule, the procedure returns to step S2 described above. In contrast, if it is not necessary to adjust the schedule, in step S5, the searching module 14 searches the schedules, the work process lists and the workload lists in the task scheduling database 6 according to search requests, and outputs the searching results.

Figure 7:
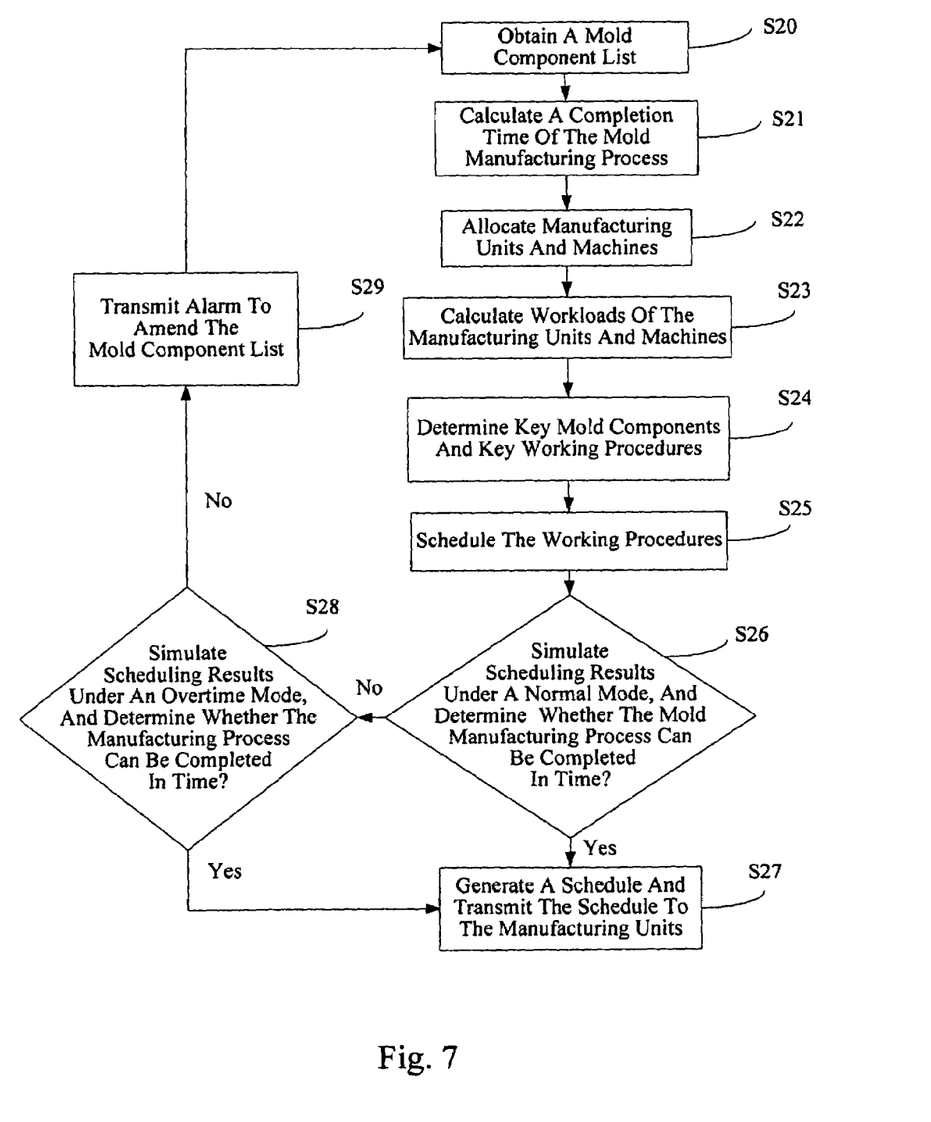
FIG. 7 is a flow chart of details of one step of FIG. 6, namely scheduling mold manufacturing working procedures and generating a schedule.

FIG. 7 is a flow chart of details of step S2, namely scheduling mold manufacturing working procedures and generating a schedule. In step S20, the mold component list obtaining sub-module 121 reads and analyzes data of the mold component list. In step S21, the mold component list obtaining sub-module 121 calculates a completion time of the whole mold manufacturing process according to the mold component list. In step S22, the mold component list obtaining sub-module 121 allocates relevant manufacturing units according to names of the working procedures. In step S23, the workload analyzing sub-module 122 obtains manufacturing capabilities of the manufacturing units and machines stored in the standard parameter database 5, and calculates workloads of the manufacturing units and machines according to the pre-scheduling tasks and scheduled tasks. In step S24, the key working procedure determining sub-module 123 determines key mold components and key working procedures. In step S25, the working procedure scheduling sub-module 124 schedules the mold manufacturing working procedures based on the key working procedures.

In step S26, the working procedure scheduling sub-module 124 simulates scheduling results, and determines whether the mold manufacturing process can be completed within the completion time under a normal mode. If the mold manufacturing process can be completed within the completion time under the normal mode, in step S27, the schedule generating sub-module 125 generates a schedule, and the schedule transmitting sub-module 126 transmits the schedule to the manufacturing units and machines. In contrast, if the mold manufacturing process cannot be completed within the completion time under the normal mode, in step S28, an overtime mode is started, and the working procedure scheduling sub-module 124 simulates the scheduling results and determines whether the mold manufacturing process can be completed within the completion time under the overtime mode. If the mold manufacturing process cannot be completed within the completion time under the overtime mode, in step S29, the working procedure scheduling sub-module 124 transmits one or more alarms to the manufacturing units to amend the mold component list. In contrast, if the mold manufacturing process can be completed within the completion time under the overtime mode, the procedure goes to step S27 described above.

Although the present invention has been specifically described on the basis of a preferred embodiment and preferred method, the invention is not to be construed as being limited thereto. Various changes or modifications may be made to the embodiment and method without departing from the scope and spirit of the invention.

We claim:

1. A system for scheduling mold manufacturing, comprising:
    a standard parameter database for storing standard parameters;
    a task scheduling database for storing scheduling data;
    a server including a data accessing module for accessing data from the standard parameter database and the task scheduling database; and
    a plurality of user computers connected with the standard parameter database and the task scheduling database, each user computer comprising:
    a standard parameter setting module for setting the standard parameters stored in the standard parameter database, the standard parameters comprising working procedure parameters, and manufacturing capabilities parameters;
    a task scheduling module for analyzing and calculating a workload of each of manufacturing units and machines, generating a workload list, scheduling working procedures of mold manufacturing according to the working procedure parameters set by the standard parameter setting module, simulating scheduling results and generating a schedule according to the manufacturing capabilities parameters set by the standard parameter setting module, saving the schedule in the task scheduling database, and transmitting the schedule to relevant manufacturing units; and
    a task tracking and feedback module for receiving a transmission of the schedule from the task scheduling module, tracking the schedule transmitted from the task scheduling module, sending out feedback of current process and workloads of the manufacturing units and machines to each of the user computers, generating a work process list, dynamically updating the workload list stored in the task scheduling database, and determining whether to adjust the schedule.

2. The system according to claim 1, wherein the standard parameter setting module comprises:
    a user authority setting sub-module for setting users' names, users' passwords, and users' authority ranks;
    a working procedure setting sub-module for setting working procedure parameters of mold manufacturing; and
    a manufacturing capability setting sub-module for setting maximal manufacturing capability parameters and standard manufacturing capability parameters of the manufacturing units and machines.

3. The system according to claim 1, wherein the task scheduling module comprises:
    a mold component list obtaining sub-module for reading and analyzing a mold component list;
    a workload analyzing sub-module for analyzing the workloads of manufacturing units and machines;
    a key working procedure determining sub-module for determining key mold components and key working procedures;
    a working procedure scheduling sub-module for scheduling mold manufacturing working procedures, simulating scheduling results, determining whether a mold manufacturing process can be completed within a completion time, and transmitting one or more alarms if the mold manufacturing process cannot be completed within the completion time;
    a schedule generating sub-module for generating a schedule; and
    a schedule transmitting sub-module for transmitting the schedule to the relevant manufacturing units.

4. The system according to claim 1, wherein each user computer further comprises:
    a searching module for searching the schedule, the work process list and the workload list according to search requests.

5. A method for scheduling mold manufacturing, comprising the steps of:
    setting standard parameters for mold manufacturing, the standard parameters comprising working procedure parameters, and manufacturing capabilities parameters;
    obtaining a mold component list;
    calculating a completion time of a mold manufacturing process;
    allocating manufacturing units and machines for the mold components according to the manufacturing capabilities parameters;
    calculating a workload of each manufacturing unit and machine;
    determining one or more key mold components and key working procedures;
    scheduling mold manufacturing working procedures, and simulating scheduling results according to the working procedure parameters;
    generating a schedule and a workload list, and transmitting the schedule to the manufacturing units;
    tracking and sending out feedback of workloads of the manufacturing units and machines, and dynamically updating the workload list stored in a task scheduling database; and
    determining whether the mold manufacturing process can be completed within the completion time, and adjusting the schedule if the mold manufacturing process cannot be completed within the completion time.

6. The method according to claim 5, further comprising the step of:

searching the schedule and the workload list according to search requests.

7. The method according to claim 5, wherein the step of setting parameters comprises the sub-steps of:
setting users' names, users' passwords and users' ranks;
setting working procedure parameters of the mold manufacturing; and
setting maximal manufacturing capability and standard manufacturing capability for each manufacturing unit and machine.

8. The method according to claim 5, wherein the step of scheduling mold manufacturing working procedures and simulating scheduling results comprises the sub-steps of:
scheduling common working procedures based on the key working procedures, and generating primary scheduling results;
simulating the primary scheduling results, and determining whether the manufacturing process can be completed within the completion time;
starting an overtime mode if the manufacturing process cannot be completed within the completion time;
scheduling the working procedures under the overtime mode, and generating scheduling results;
simulating the scheduling results under the overtime mode, and determining whether the manufacturing process can be completed within the completion time; and
alarming to amend the mold component list if the manufacturing process cannot be completed within the completion time.

9. The method according to claim 5, wherein the step of tracking and sending out feedback of workloads of the manufacturing units and machines, and dynamically updating the workload list stored in a task scheduling database comprises the sub-steps of:
tracking and sending out feedback of current process of the manufacturing units and machines, and generating a work process list; and
searching the work process list according to search requests.

10. A method for scheduling manufacture of a workpiece, comprising the steps of:
setting parameters related to said manufacture of said workpiece;
calculating a completion time of said manufacture according to a component list of said workpiece;
allocating manufacturing units and machines to achieve said manufacture of said workpiece according to said component list of said workpiece;
calculating a workload of each of said manufacturing units and machines;
scheduling working procedures for said manufacture based on said completion time and said workload; and
modifying said working procedures based on said completion time and said workloads of said manufacturing units and machines.

11. The method according to claim 10, further comprising the step of identifying key components and working procedures according to said workloads of said manufacturing units and machines before said scheduling step.

12. The method according to claim 10, wherein modification of said working procedures is firstly simulated under a normal mode of said workloads and then an overtime mode of said workloads in said modifying step.

* * * * *